US012748413B2

(12) United States Patent
Mukherjee et al.

(10) Patent No.: US 12,748,413 B2
(45) Date of Patent: Sep. 29, 2026

(54) SYSTEM AND METHOD FOR MULTI IMAGE MATCHING FOR OUTAGE PREDICTION, PREVENTION, AND MITIGATION FOR TECHNOLOGY INFRASTRUCTURE USING RULES-BASED STATE MACHINES

(71) Applicant: Bank of America Corporation, Charlotte, NC (US)

(72) Inventors: Maharaj Mukherjee, Poughkeepsie, NY (US); Utkarsh Raj, Charlotte, NC (US); Colin Murphy, Charlotte, NC (US); Elvis Nyamwange, Little Elm, TX (US); Carl Benda, Charlotte, NC (US); Suman Roy Choudhury, Jersey City, NJ (US); Vijay Kumar Yarabolu, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 683 days.

(21) Appl. No.: 18/198,375

(22) Filed: May 17, 2023

(65) Prior Publication Data

US 2024/0385612 A1 Nov. 21, 2024

(51) Int. Cl.
*G05B 23/02* (2006.01)

(52) U.S. Cl.
CPC ................................ *G05B 23/0243* (2013.01)

(58) Field of Classification Search
CPC ............................ G05B 23/0243; G06F 18/22
See application file for complete search history.

(56) References Cited

U.S. PATENT DOCUMENTS 11,625,293 B1 4/2023 Ratkovic et al.
2007/0101202 A1 * 5/2007 Garbow ................ G06F 11/008 714/47.2

(Continued)

FOREIGN PATENT DOCUMENTS

SG 10201610116 P 6/2018

OTHER PUBLICATIONS

Jun. 3, 2005—(US) Notice of Allowance—U.S. Appl. No. 18/197,924.

(Continued)

*Primary Examiner* — Christopher W Carter
(74) *Attorney, Agent, or Firm* — Banner & Witcoff, Ltd.

(57) ABSTRACT

A computing platform may configure a rules-based state machine to predict system failure for a system based on telemetry state images and transitions between the telemetry state images. The computing platform may receive initial telemetry data. The computing platform may generate, based on the initial telemetry data, an initial telemetry state image. The computing platform may receive additional telemetry data, and may generate, based on the additional telemetry data, an additional telemetry state image. The computing platform may compare a pattern, corresponding to the initial telemetry state image, the additional telemetry state image, and a corresponding transition, to historical patterns to identify a match. The computing platform may identify, using the identified matching pattern, a likelihood of failure for the system, and may send, based on the likelihood of failure for the system, preemptive resolution commands causing modification of operations at the system to prevent a predicted failure.

16 Claims, 15 Drawing Sheets

(56) References Cited

U.S. PATENT DOCUMENTS

| | | | |
|---|---|---|---|
| 2014/0278496 A1 | 9/2014 | Spencer | |
| 2014/0310564 A1 | 10/2014 | Mallige et al. | |
| 2015/0067410 A1* | 3/2015 | Kumar | G06F 11/004 714/47.3 |
| 2015/0149134 A1 | 5/2015 | Mehta et al. | |
| 2016/0041948 A1 | 2/2016 | Vichare et al. | |
| 2016/0155315 A1 | 6/2016 | McElhinney et al. | |
| 2016/0266962 A1 | 9/2016 | Rajasekharan et al. | |
| 2016/0292028 A1* | 10/2016 | Gamage | G06F 9/542 |
| 2018/0157963 A1 | 6/2018 | Salti et al. | |
| 2019/0097873 A1* | 3/2019 | Nucci | G06F 11/008 |
| 2019/0139441 A1 | 5/2019 | Akella et al. | |
| 2019/0179723 A1 | 6/2019 | Allin et al. | |
| 2019/0199602 A1 | 6/2019 | Zhang et al. | |
| 2020/0125465 A1 | 4/2020 | Choi et al. | |
| 2020/0151042 A1* | 5/2020 | Spencer | G06N 20/00 |
| 2020/0201697 A1 | 6/2020 | Torng et al. | |
| 2020/0295986 A1 | 9/2020 | Rathinasabapathy et al. | |
| 2021/0056678 A1 | 2/2021 | Al Shehri et al. | |
| 2022/0246657 A1 | 8/2022 | Lin et al. | |
| 2022/0269035 A1 | 8/2022 | Kimura et al. | |
| 2022/0271072 A1 | 8/2022 | Miyata | |
| 2022/0295000 A1 | 9/2022 | Yamazaki et al. | |
| 2022/0295006 A1 | 9/2022 | Kashiwagi | |
| 2022/0310684 A1 | 9/2022 | Sakata et al. | |
| 2022/0321791 A1 | 10/2022 | Lin et al. | |
| 2022/0372181 A1 | 11/2022 | Iwata et al. | |
| 2022/0392944 A1 | 12/2022 | Tochigi et al. | |
| 2022/0399469 A1 | 12/2022 | Minari | |
| 2022/0408046 A1 | 12/2022 | Katou et al. | |
| 2022/0415947 A1 | 12/2022 | Hasegawa | |
| 2022/0417464 A1 | 12/2022 | Tatsuzawa | |
| 2023/0005981 A1 | 1/2023 | Ito et al. | |
| 2023/0013149 A1 | 1/2023 | Akiyama | |
| 2023/0014856 A1 | 1/2023 | Goto | |
| 2023/0020741 A1 | 1/2023 | Liu et al. | |
| 2023/0058009 A1 | 2/2023 | Tsuchimoto et al. | |
| 2023/0073737 A1 | 3/2023 | Li et al. | |
| 2023/0110102 A1 | 4/2023 | Li et al. | |

OTHER PUBLICATIONS

Dec. 27, 2024—(US) Office Action—U.S. Appl. No. 18/198,367.

Di Liu et al. "An Improved Dynamic Load-balancing Model" IEEE (Year 2016).

Javier Lopez et al. "A Resilient Architecture for the Smart Grid" IEEE (Year 2018).

Emre Gures "Machine Learning-Based Load Balancing Algorithms in Future Heterogeneous Networks: A Survey" IEEE (Year 2022).

Li Liu et al. "Machine Learning-Based Load Balancing Algorithms in Future Heterogeneous Networks: A Survey" IEEE (Year 2007).

Areeg Samir et al. "A Controller Architecture for Anomaly Detection, Root Cause Analysis and Self-Adaptation for Cluster Architectures" Year 2019.

Qing Wang et al. "Constructing the Knowledge Base for Cognitive IT Service Manaement" (Year 2017).

Jan. 2, 2025—(US) Notice of Allowance—U.S. Appl. No. 18/201,817.

Apr. 8, 2025—(US) Notice of Allowance—U.S. Appl. No. 18/201,817.

Li Liu et al. "Fault Detection, Diagnostics, and Prognostics: Software Agent Solutions" IEEE Transactions on Vehicular Technology, vol. 56, No. 4 (Year Jul. 2007).

Aug. 26, 2025—(US) Notice of Allowance—U.S. Appl. No. 18/198,367.

* cited by examiner

1300

SYSTEM AND METHOD FOR MULTI IMAGE MATCHING FOR OUTAGE PREDICTION, PREVENTION, AND MITIGATION FOR TECHNOLOGY INFRASTRUCTURE USING RULES-BASED STATE MACHINES

CROSS REFERENCE TO RELATED APPLICATIONS

This application is related to U.S. application Ser. No. 18/198,367, filed May 17, 2023, and entitled "System and Method for Multi Image Matching for Outage Prediction, Prevention, and Mitigation for Technology Infrastructure Using Hybrid Deep Learning," which is incorporated herein by reference in its entirety.

BACKGROUND

In some instances, applications may rely on a technology infrastructure to ensure their operation. Accordingly, it may be important to create a reliable technology infrastructure and minimize the occurrence of any corresponding failures/outages. In some instances, a current system performance may be analyzed to identify a likelihood of failure. In some instances, however, a series of previous events occurring in a time series leading up to a current time may be relevant to the analysis. In failing to consider such information, an accuracy of failure detection may be reduced. Accordingly, it may be important to improve the process of preemptive failure detection to prevent system failures and/or outages.

SUMMARY OF THE INVENTION

Aspects of the disclosure provide effective, efficient, scalable, and convenient technical solutions that address and overcome the technical problems associated with system failure prediction and prevention. In accordance with one or more embodiments of the disclosure, a computing platform comprising at least one processor, a communication interface, and memory storing computer-readable instructions may configure a rules-based state machine to predict system failure for a system based on telemetry state images and transitions between the telemetry state images. The computing platform may receive initial telemetry data. The computing platform may generate, based on the initial telemetry data, an initial telemetry state image. The computing platform may receive additional telemetry data. The computing platform may generate, based on the additional telemetry data, an additional telemetry state image. The computing platform may compare a pattern, corresponding to the initial telemetry state image, the additional telemetry state image, and a transition between the initial telemetry state image and the additional telemetry image, to the telemetry state images and the transitions between the telemetry state images of the rules-based state machine to identify a matching pattern. The computing platform may identify, using the identified matching pattern, a likelihood of failure for the system. The computing platform may send, based on the likelihood of failure for the system, one or more preemptive resolution commands causing modification of operations at the system to prevent a predicted failure.

In one or more instances, configuring the rules-based state machine may include: 1) receiving historical telemetry data; 2) normalizing the historical telemetry data; 3) generating, based on the historical telemetry data, the telemetry state images; 4) identifying the transitions between the telemetry state images; and 5) labeling historical patterns corresponding to the telemetry state images and the transitions between the telemetry state images based on detected failures. In one or more instances, generating, based on the initial telemetry data, the initial telemetry state image may include: 1) normalizing the initial telemetry data, and 2) generating the initial telemetry state image based on the normalized initial telemetry data. Generating, based on the additional telemetry data, the additional telemetry state image may include: 1) normalizing the additional telemetry data, and generating the additional telemetry state image based on the normalized additional telemetry data.

In one or more examples, comparing the pattern to the telemetry state images and the transitions between the telemetry state images of the rules-based state machine to identify the matching pattern may include using an image matching model to: 1) identify a match between the initial telemetry state image and a first image of the telemetry state images, and 2) identify a match between the additional telemetry state images and a second image of the telemetry state images, where the second image of the telemetry state images may be linked to the first image of the telemetry state images within the rules-based state machine, and where a transition between the initial telemetry state image and the additional telemetry state image may match a transition between the first image and the second image.

In one or more instances, identifying, using the identified matching pattern, the likelihood of failure for the system may include identifying a likelihood of failure of the matching pattern, where the matching pattern may be labelled based on the likelihood of failure of the matching pattern. In one or more instances, the computing platform may compare the likelihood of failure of the matching pattern to a failure threshold, and sending the one or more preemptive resolution commands causing modification of the operations at the system to prevent the predicted failure may be in response to identifying that the likelihood of failure of the matching pattern meets or exceeds the failure threshold.

In one or more examples, sending the one or more preemptive resolution commands may include directing a load management server associated with the system to redirect incoming requests away from the system. In one or more examples, sending the one or more preemptive resolution commands may include directing a user device to display a recommended solution to avoid the predicted failure along with a prompt for whether or not the recommended solution should be executed.

In one or more instances, the computing platform may receive user input accepting the recommended solution. The computing platform may execute, in response to receiving the user input, the recommended solution.

In one or more examples, the computing platform may receive third telemetry data. The computing platform may generate, based on the third telemetry data, a third telemetry state image. The computing platform may compare an updated pattern, corresponding to the initial telemetry state image, the additional telemetry state image, the transition between the initial telemetry state image and the additional telemetry state image, the third telemetry state image, and a transition between the additional telemetry state image and the third telemetry state image, to the telemetry state images and the transitions of the rules-based state machine to identify an updated matching pattern. The computing platform may identify, using the identified updated matching pattern, a new likelihood of failure for the system, which may be different than the likelihood of failure.

BRIEF DESCRIPTION OF DRAWINGS

The present disclosure is illustrated by way of example and is not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

The following description relates to a system and method for multi image matching for outage prediction, prevention, and mitigation for technology infrastructure using a rules-based state machine, as is described further below. Preventing and predicting an outage for a technology infrastructure may be key to making sure that the backbone of the customer and employee facing applications run smoothly and avoid downtime. Outage prediction may involve not only looking at the current status of an overall system, but also evaluating a series of other events that might have led to the current status. To predict whether or not the current status is safe or may lead to some unsafe condition leading to an outage, the series of system statuses at various time intervals should be taken into consideration. Accordingly, described herein is the use of a state machine, configured to analyze images representing heatmaps corresponding to current system status.

Figure 8:
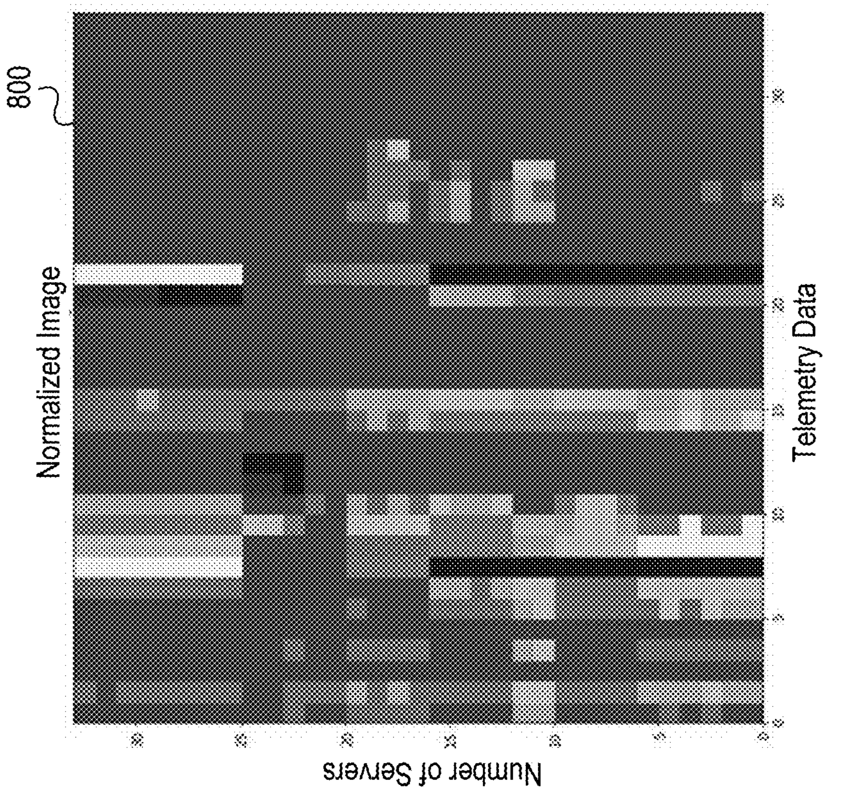
FIGS. 7-13 depict illustrative diagrams for using a rules-based state machine to perform multi image matching for outage prediction, prevention, and mitigation in accordance with one or more example embodiments.
Figure 7:
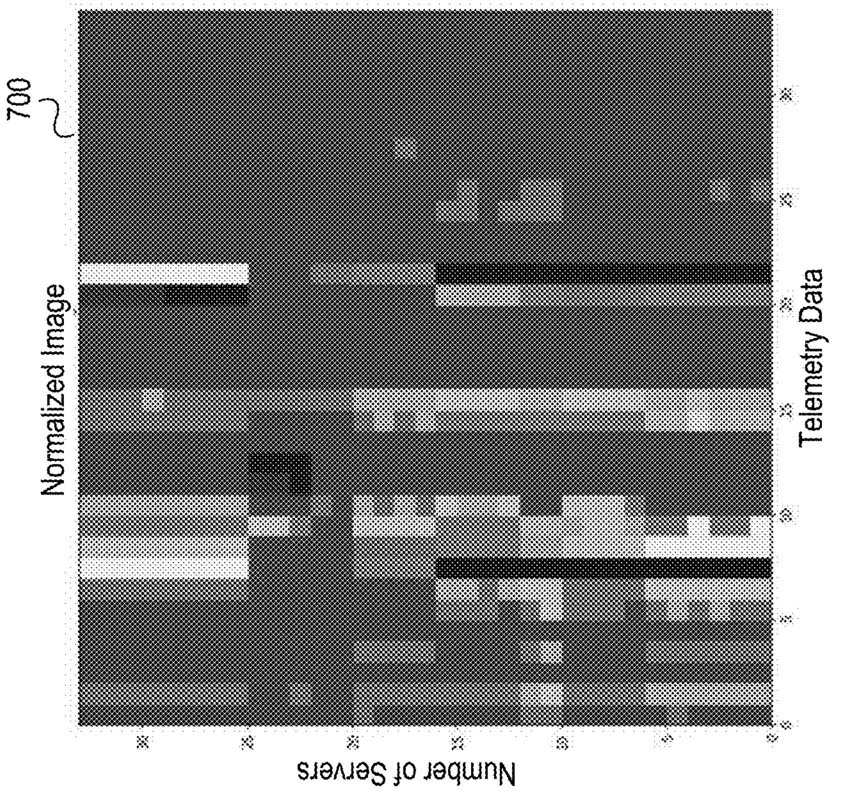

Thermal images may capture the overall wellness and capacity of an infrastructure system. The thermal image may be created by starting with a table of raw telemetry data. This data may be normalized to convert each cell value between zero and one in floating point numbers. The resulting matrix may be a normalized image. Examples of this normalized image may be displayed by appropriate thresholding where a color is associated with each of the threshold ranges. Some examples of these normalized images are shown in normalized image 700, which is shown in FIG. 7 and normalized image 800, which is shown in FIG. 8.

Figure 9:
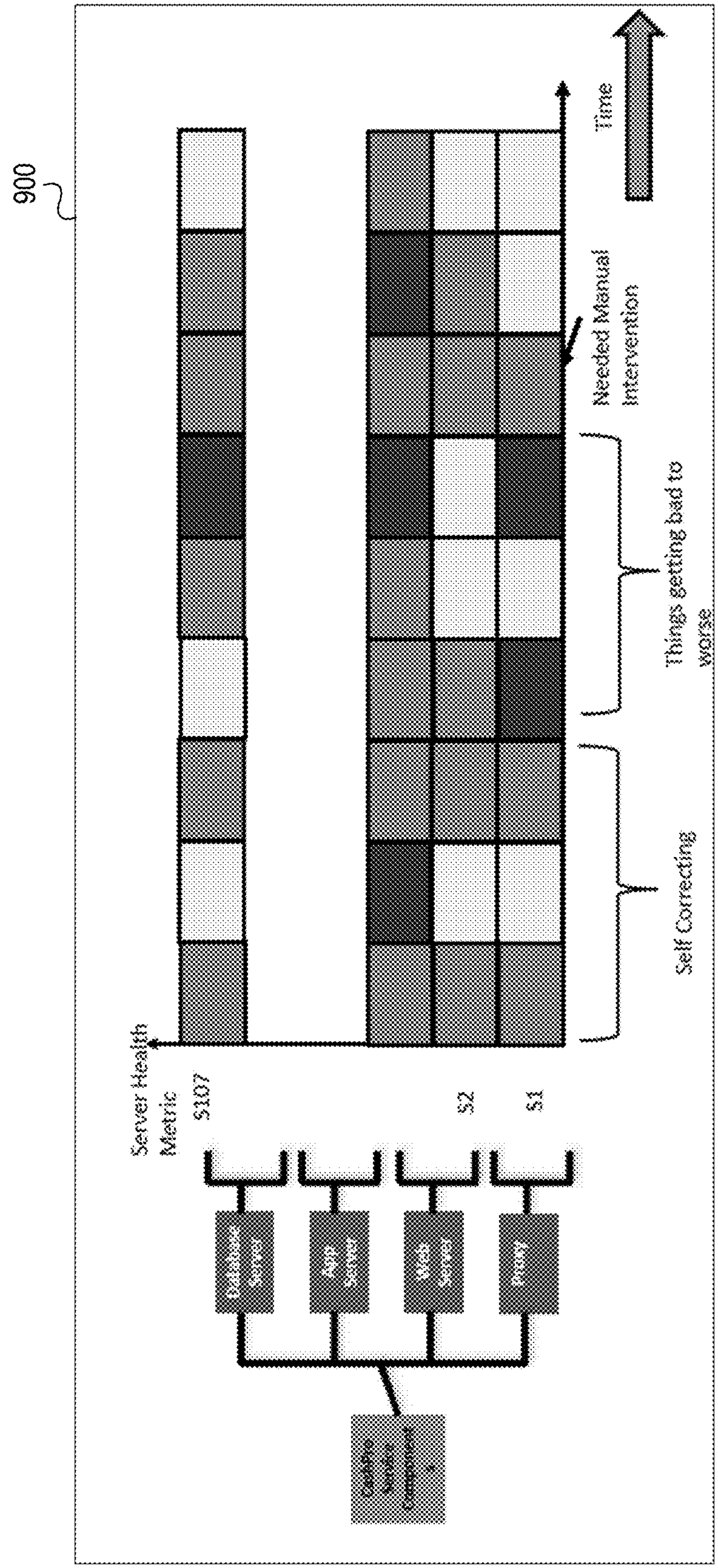
Figure 10:
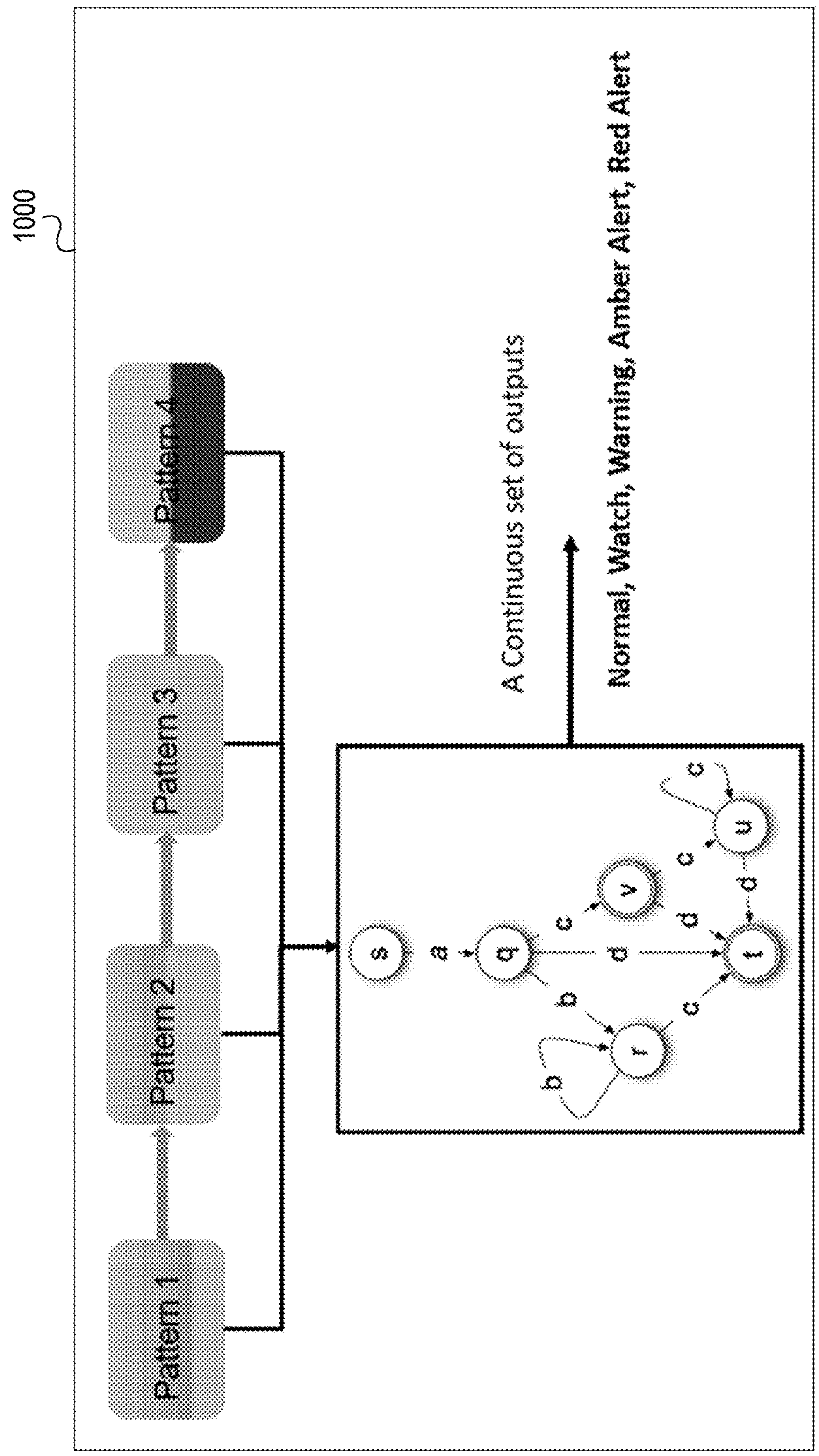

These normalized images represent the overall health of the system and may be directly attributed and linked to any events, incidents, and/or alerts generated. For example, normalized image 700 and normalized image 800 show two separate images of the overall system status at two different times. The heatmap or thermal images of different times may be considered to predict any potential outages, so that steps may be taken to mitigate or prevent potential outages. For example, diagram 900 of FIG. 9, and diagram 1000 of FIG. 10 show different examples of how a different image series may lead to different outcomes.

In order to distinguish different series of patterns from one another, a rule based state machine (as depicted, for example, in diagram 1000 of FIG. 10) may be used. The state machine may work similar to a spell checker as shown in diagram 1100 of FIG. 11 using a data structure called "Trie." Just as a spell checker which lists all the known words in a dictionary, the rules-based state machine may first identify and catalogue all images that may lead to failures, and catalog them before creating the state machines. If more and more patterns appear, they may be added to the catalog within the state machine.

Figure 11:
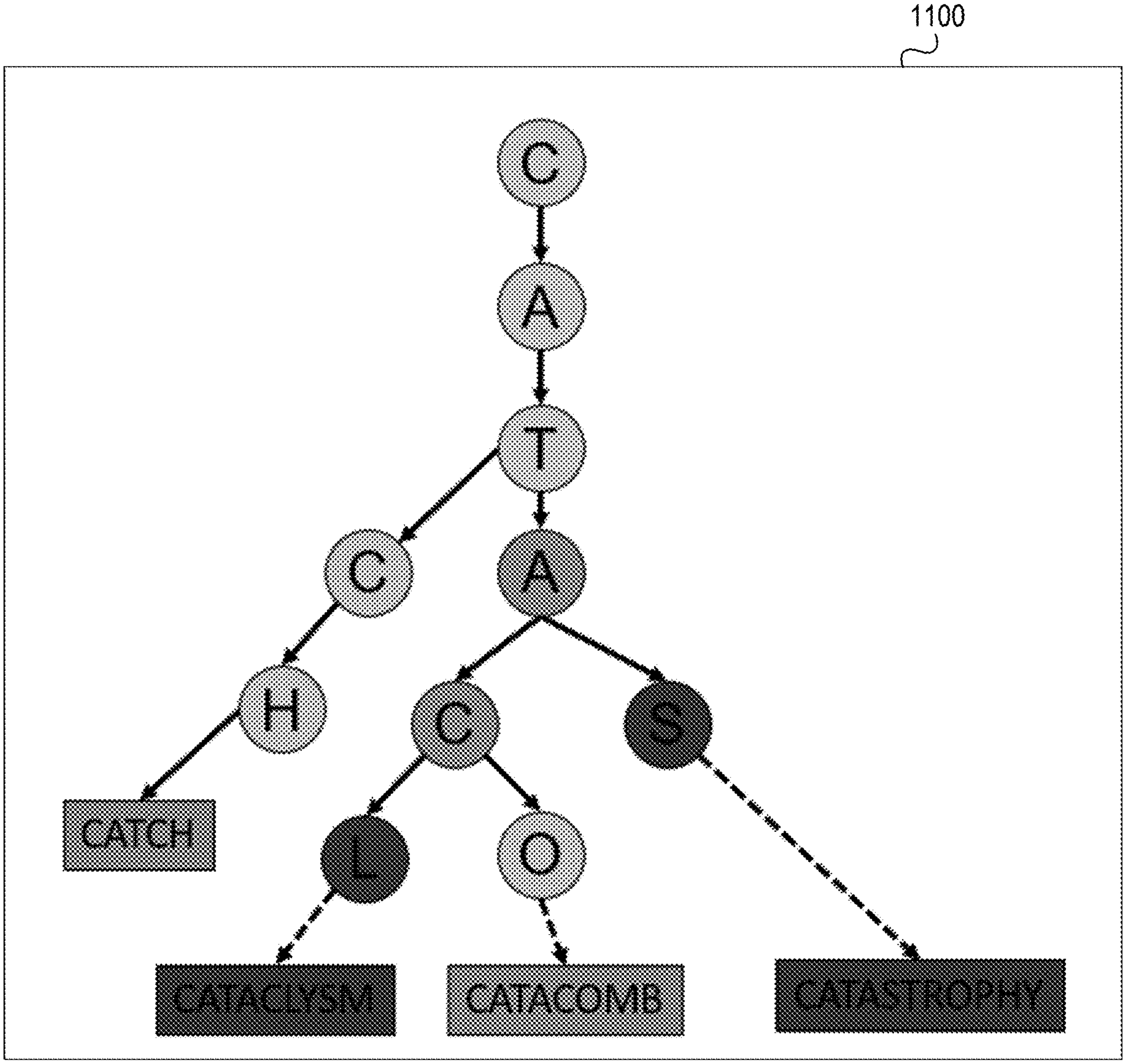
Figure 12:
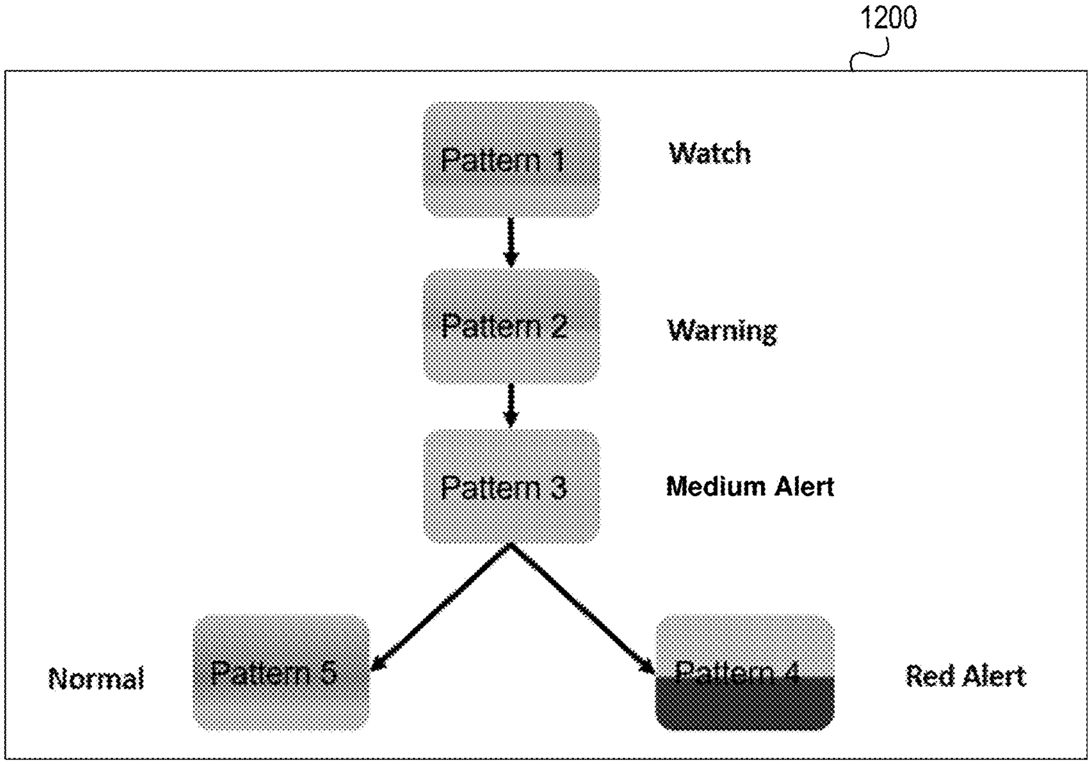

A simple state machine is depicted in diagram 1200 of FIG. 12, which also uses a "Trie" as shown for the spell checker in FIG. 11. A more complex state machine is shown in diagram 1300 of FIG. 13, which shows more states and a more complex state transition diagram. In some embodiments, as and when a state transitions from one to another, an appropriate alert may be generated for a user to take mitigating actions.

These and other features are described in greater details below.

Figure 1A:
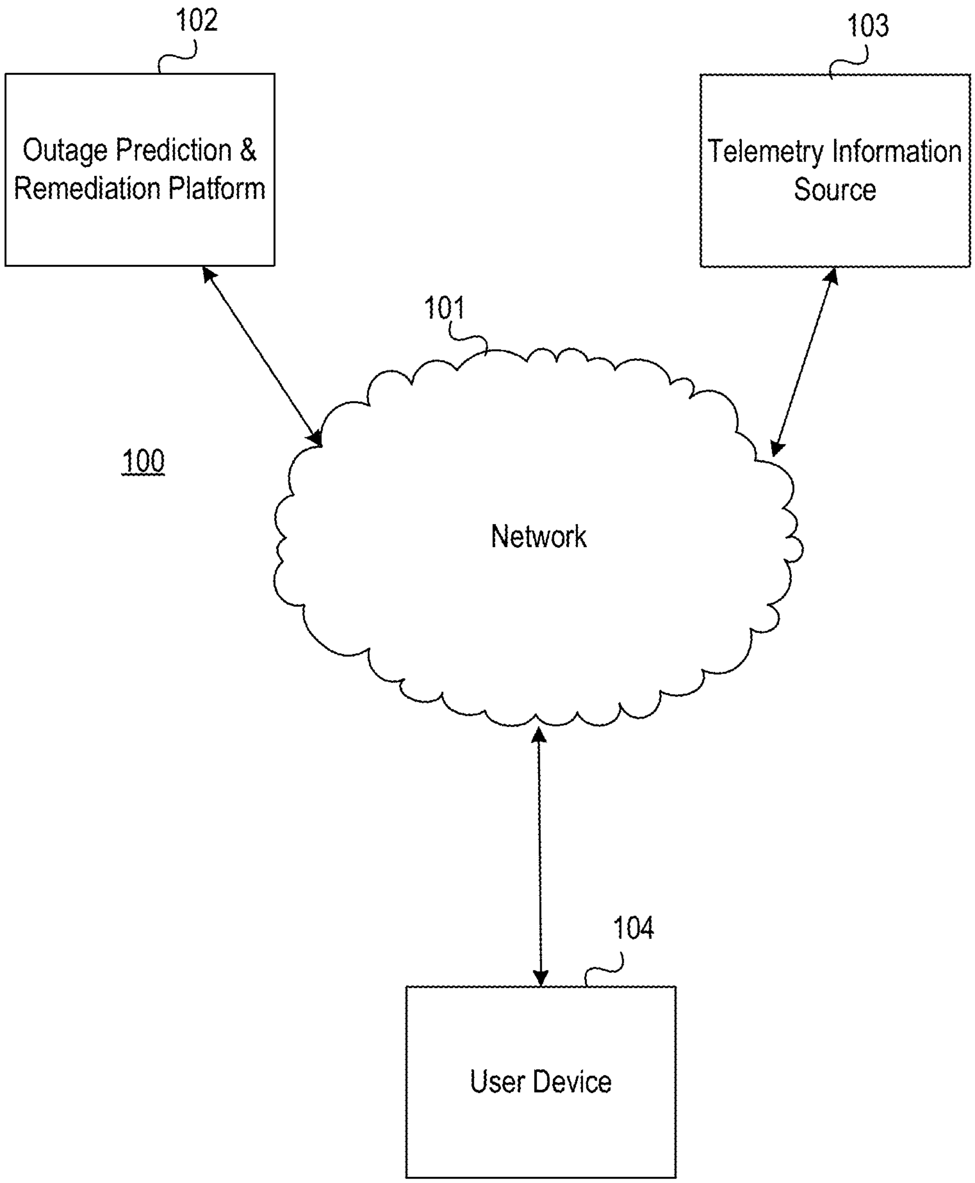
FIGS. 1A and 1B depict an illustrative computing environment for using a rules-based state machine to perform multi image matching for outage prediction, prevention, and mitigation in accordance with one or more example embodiments.
Figure 1B:
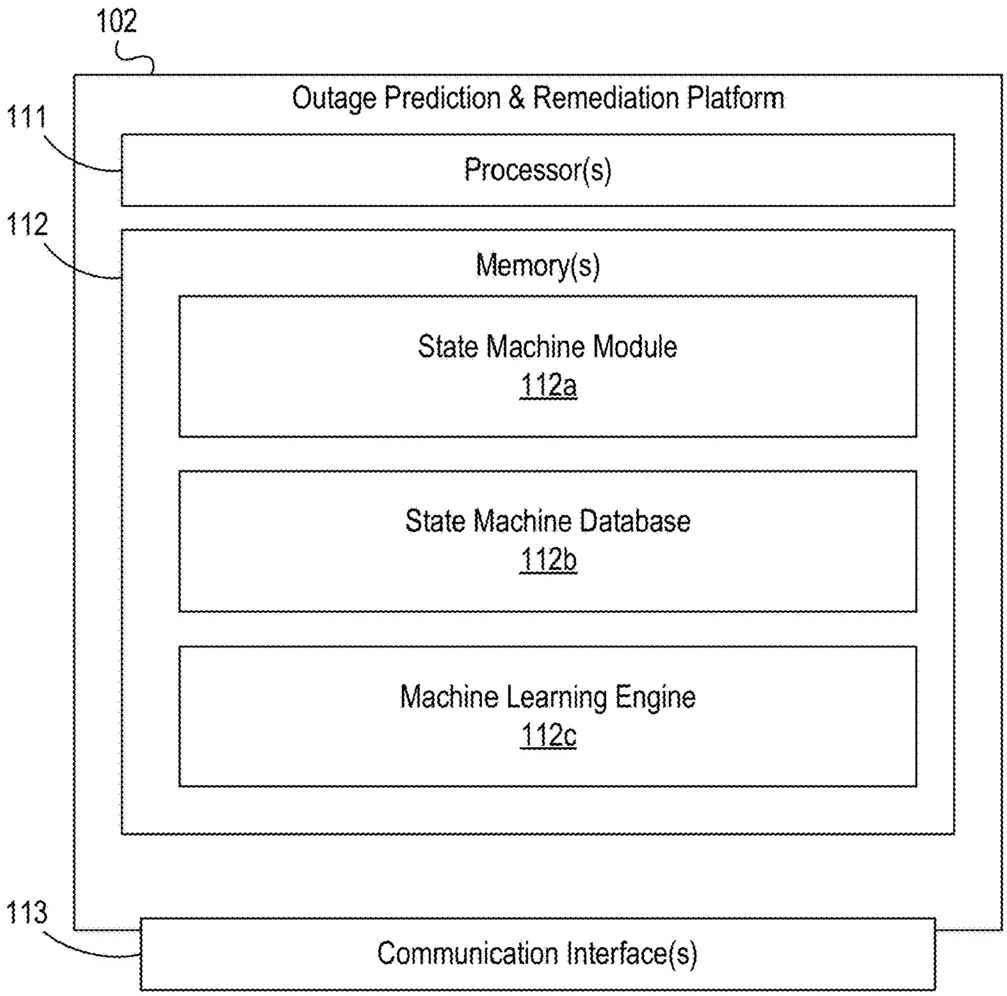

FIGS. 1A-1B depict an illustrative computing environment for using a rules-based state machine to perform multi image matching for outage prediction, prevention, and mitigation in accordance with one or more example embodiments. Referring to FIG. 1A, computing environment 100 may include one or more computer systems. For example, computing environment 100 may include an outage prediction and remediation platform 102, telemetry information source 103, and user device 104.

Outage prediction and remediation platform 102 may include one or more computing devices and/or other computer components (e.g., processors, memories, communication interfaces, or the like). For example, the outage prediction and remediation platform 102 may be configured to generate, update, and/or otherwise maintain a state machine that includes a plurality of state machine images and the corresponding transitions between each of the plurality of state machine images. In some instances, the state machine may further include labels corresponding to a likelihood of failure for a given state machine image based on any linked images and the corresponding transitions. In some instances, the outage prediction and remediation platform 102 may be configured to perform image matching using the state machine to identify matching patterns of state images and their corresponding transitions over time. Based on the identified matching patterns, the outage prediction and remediation platform 102 may be configured to trigger preemptive resolution actions to avoid any predicted failures.

Telemetry information source 103 may be or include one or more computing devices (e.g., servers, server blades, or the like) and/or other computer components (e.g., processors, memories, communication interfaces, and/or other components). In some instances, the telemetry information source 103 may be configured to monitor a plurality of individual systems to collect the corresponding telemetry data. In other instances, the telemetry information source 103 may be the source of the telemetry data itself (e.g., producing the telemetry data). Although a single telemetry information source 103 is shown, any number of telemetry information sources 103 may be included in the system architecture without departing from the scope of the disclosure.

User device 104 may be or include one or more devices (e.g., laptop computers, desktop computer, smartphones, tablets, and/or other devices) configured for use in receiving preemptive resolution information from the outage prediction and remediation platform. In some instances, the user device 104 may be configured to display graphical user interfaces (e.g., preemptive resolution information, or the like). Any number of such user devices may be used to implement the techniques described herein without departing from the scope of the disclosure.

Computing environment 100 also may include one or more networks, which may interconnect outage prediction and remediation platform 102, telemetry information source 103, and user device 104. For example, computing environment 100 may include a network 101 (which may interconnect, e.g., outage prediction and remediation platform 102, telemetry information source 103, and user device 104).

In one or more arrangements, outage prediction and remediation platform 102, telemetry information source 103, and user device 104 may be any type of computing device capable of receiving a user interface, receiving input via the user interface, and communicating the received input to one or more other computing devices. For example, outage prediction and remediation platform 102, telemetry information source 103, user device 104, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of outage prediction and remediation platform 102, telemetry information source 103, and user device 104 may, in some instances, be special-purpose computing devices configured to perform specific functions.

Referring to FIG. 1B, outage prediction and remediation platform 102 may include one or more processors 111, memory 112, and communication interface 113. A data bus may interconnect processor 111, memory 112, and communication interface 113. Communication interface 113 may be a network interface configured to support communication between outage prediction and remediation platform 102 and one or more networks (e.g., network 101, or the like). Memory 112 may include one or more program modules having instructions that when executed by processor 111 cause outage prediction and remediation platform 102 to perform one or more functions described herein and/or one or more databases that may store and/or otherwise maintain information which may be used by such program modules and/or processor 111. In some instances, the one or more program modules and/or databases may be stored by and/or maintained in different memory units of outage prediction and remediation platform 102 and/or by different computing devices that may form and/or otherwise make up outage prediction and remediation platform 102. For example, memory 112 may have, host, store, and/or include state machine module 112*a*, state machine database 112*b*, and machine learning engine 112*c*. State machine module 112*a* may have instructions that direct and/or cause outage prediction and remediation platform 102 to execute advanced optimization techniques to generate, apply, and/or otherwise maintain a state machine for predicting and remediating potential system failures. State machine database 112*b* may store information used by state machine module 112*a*, in executing, generating, applying, and/or otherwise maintaining a state machine for predicting and remediating potential system failures and/or in performing other functions. Machine learning engine 112*c* may be used to train, deploy, and/or otherwise refine models used to support functionality of the state machine module 112*a* through both initial training and one or more dynamic feedback loops, which may, e.g., enable continuous improvement of the outage prediction and remediation platform 102 and further optimize the prediction and remediation of system failures.

Figure 2A:
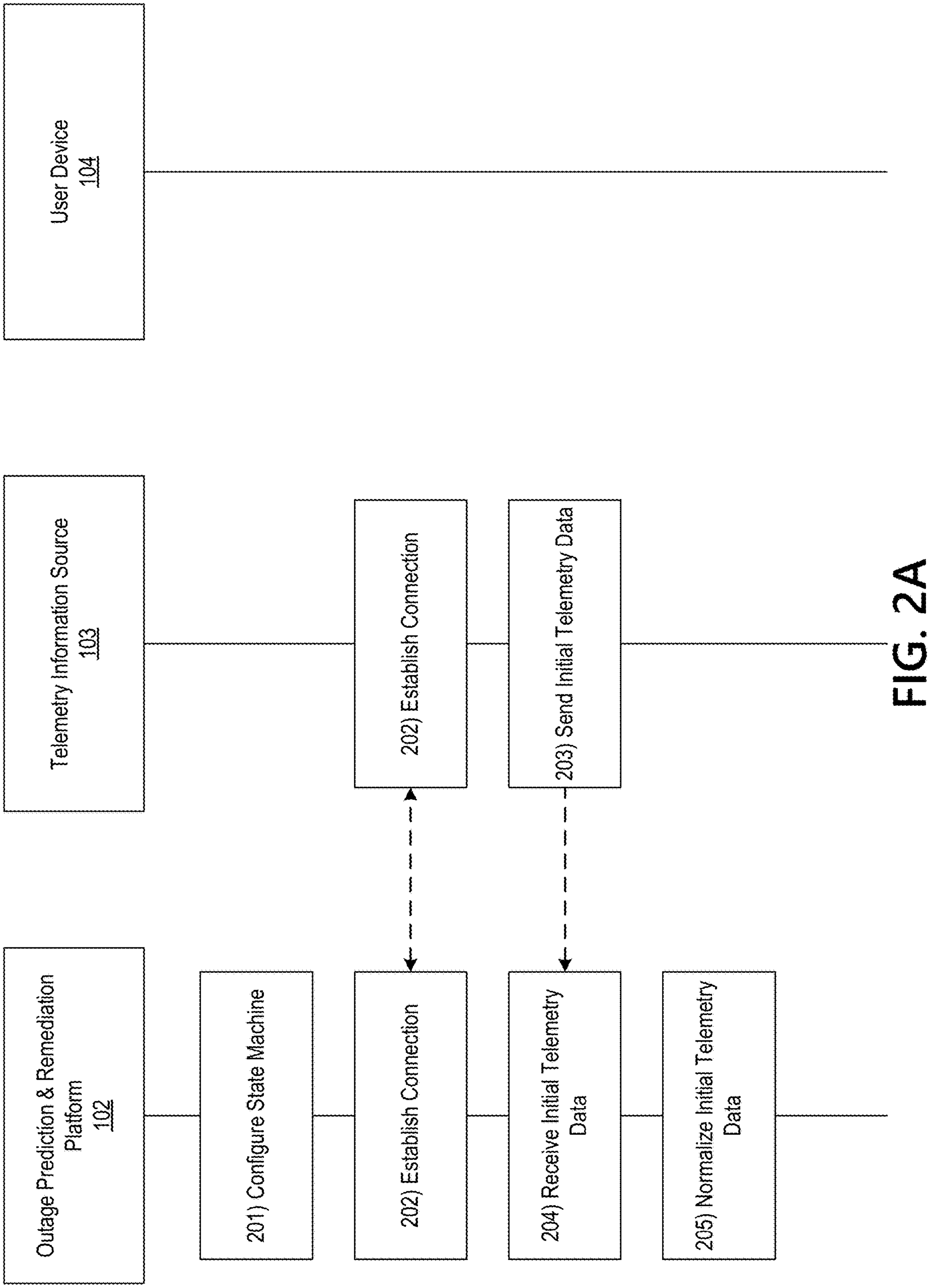
FIGS. 2A-2D depict an illustrative event sequence for using a rules-based state machine to perform multi image matching for outage prediction, prevention, and mitigation in accordance with one or more example embodiments.

FIGS. 2A-2D depict an illustrative event sequence for using a rules-based state machine to perform multi image matching for outage prediction, prevention, and mitigation in accordance with one or more example embodiments. Referring to FIG. 2A, at step 201, the outage prediction and remediation platform 102 may configure a rules-based state machine. For example, the outage prediction and remediation platform 102 may receive historical telemetry data (e.g., from the telemetry information source 103, and/or otherwise). The outage prediction and remediation platform 102 may normalize the historical telemetry data to create normalized telemetry data values between zero and one (e.g., in floating point numbers). Based on the normalized telemetry data, the outage prediction and remediation platform 102 may generate telemetry state images, similar to the normalized images depicted in FIGS. 7 and 8. Once the telemetry state images have been generated, the outage prediction and remediation platform 102 may receive failure information indicating telemetry state images indicative of a state of system failure or outage, and may label the telemetry state images accordingly. The outage prediction and remediation platform 102 may then generate a state machine based on these labelled telemetry state images and the corresponding transitions between them, which may effectively create a data tree indicating a progression of telemetry state images over time leading to either a positive (e.g., no failure) or negative (e.g., failure) result.

As a particular example, the state machine may be represented by the diagram 1200 in FIG. 12. For example, each of the patterns one through five may correspond to a telemetry state image. In this example, where pattern one is identified, the state machine's understanding of the likelihood of failure resulting from pattern four (e.g., the potential to transition from pattern one to pattern two to pattern three, and ultimately to pattern four) may trigger the output of a "watch" label. Then, if pattern one transitions to pattern two, the state machine may understand that a likelihood of failure resulting from pattern four may be more imminent, and may thus trigger a "warning" label. Similarly, the transition from pattern two to pattern three may trigger a "medium alert" label. If a transition is made from pattern three to pattern four, a "red alert" label may be generated indicating an imminent system failure. In contrast, if a transition is made from pattern three to pattern five, a "normal" label may be generated, indicating that the system is in a state of satisfactory operation.

Figure 13:
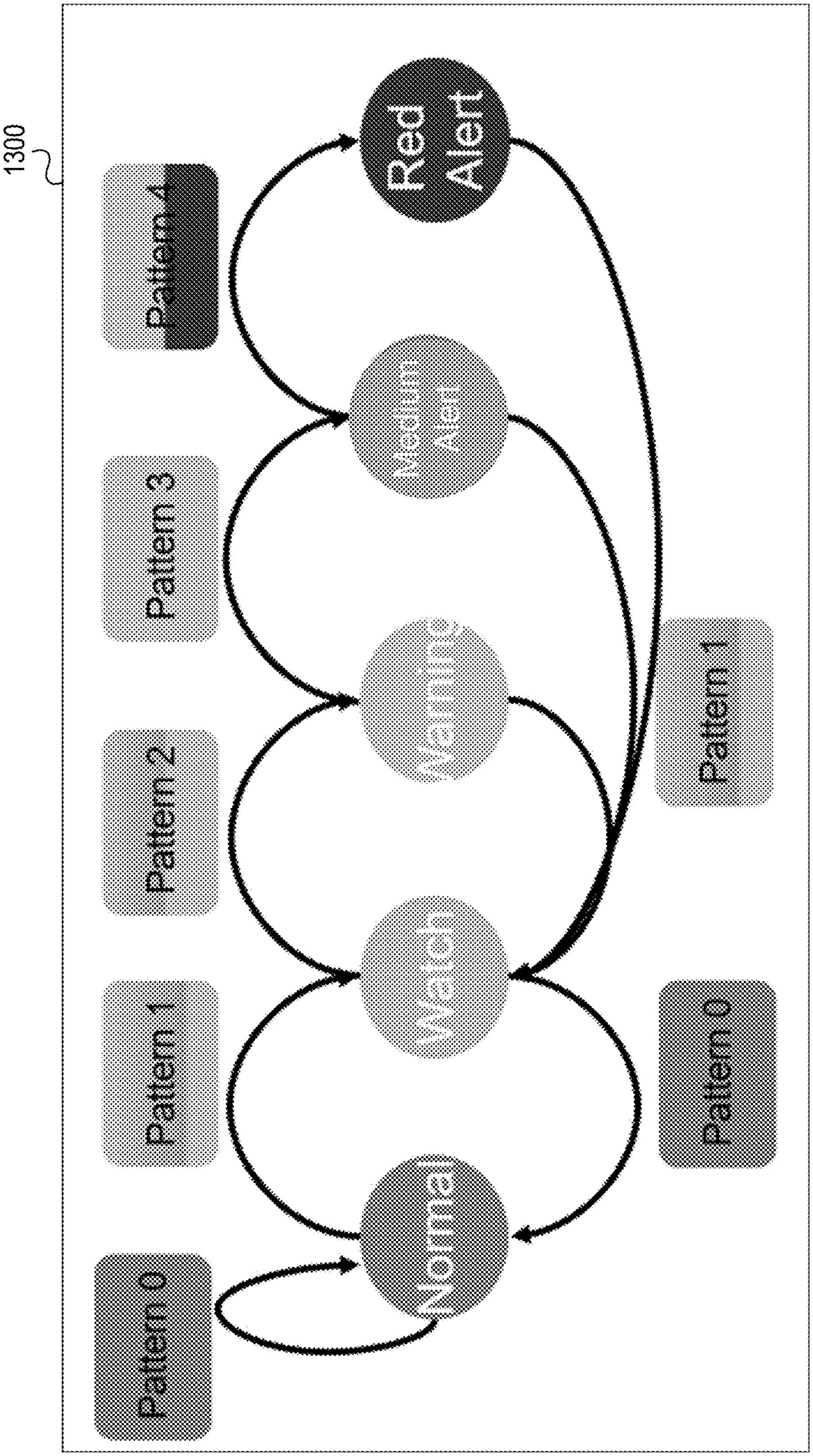

Diagram 1300 depicts another example of such a state machine. For example, the state machine may be configured to identify a likelihood of failure and/or warning level (e.g., normal, watch, warning, medium alert, red alert, or the like) based on a progression of patterns between the telemetry state images and the corresponding transitions. For example, as shown in FIG. 13, a transition from pattern zero to pattern one may trigger a "watch" label. From there, a transition from pattern one to pattern two may trigger a "warning" label, whereas a transition from pattern one to pattern zero may return the label to "normal" status.

Accordingly, the state machine may be configured to perform image comparison to the stored patterns, as well as the transitions between such patterns to predict a likelihood of failure. In some instances, the state machine may have labels associated with a warning level (e.g., normal, watch, warning, medium alert, red alert, or the like, which may e.g., be progressive in their corresponding likelihoods of failure), a likelihood of failure score (e.g., a score between zero and one hundred with zero being the least likelihood of failure and one hundred being the highest likelihood of failure, a color (e.g., green, yellow, red, or the like), and/or other indicator of a likelihood of failure. In some instances, these labels may be configured, input, and/or otherwise determined manually, semi-automatically, and/or automatically by the outage prediction and remediation platform 102.

In doing so, the outage prediction and remediation platform 102 may configure a state machine configured to consider both a current state of a system based on telemetry data, as well as the transition of the state over time. For example, a given state may be more concerning when it occurs after a first state than after a second state, or the like.

With further reference to FIG. 2A, at step 202, the telemetry information source 103 may establish a connection with the outage prediction and remediation platform 102. For example, the telemetry information source 103 may establish a first wireless data connection with the outage prediction and remediation platform 102 to link the telemetry information source 103 to the outage prediction and remediation platform 102 (e.g., in preparation for sending telemetry information). In some instances, the telemetry information source 103 may identify whether or not a connection is already established with the outage prediction and remediation platform 102. If a connection is already established with the outage prediction and remediation platform 102, the telemetry information source 103 might not re-establish the connection. If a connection is not yet established with the outage prediction and remediation platform 102, the telemetry information source 103 may establish the first wireless data connection as described herein.

At step 203, the telemetry information source 103 may send initial telemetry data to the outage prediction and remediation platform 102. For example, the telemetry information source 103 may send time stamps, dates, system names, computer processing unit (CPU) information, memory information, and/or other telemetry information corresponding to performance of a plurality of systems (and/or the telemetry information source 103 itself). In some instances, the telemetry information source 103 may send the initial telemetry data while the first wireless data connection is established.

At step 204, the outage prediction and remediation platform 102 may receive the initial telemetry data sent at step 203. For example, the outage prediction and remediation platform 102 may receive the initial telemetry data via the communication interface 113 and while the first wireless data connection is established.

At step 205, the outage prediction and remediation platform 102 may normalize the initial telemetry data received at step 204. For example, the outage prediction and remediation platform 102 may convert the initial telemetry data (which may, e.g., include values of different sizes, ranges, or the like) to values between zero and one. In doing so, the outage prediction and remediation platform 102 may configure the initial telemetry data for representation as an initial telemetry state image.

Figure 2B:
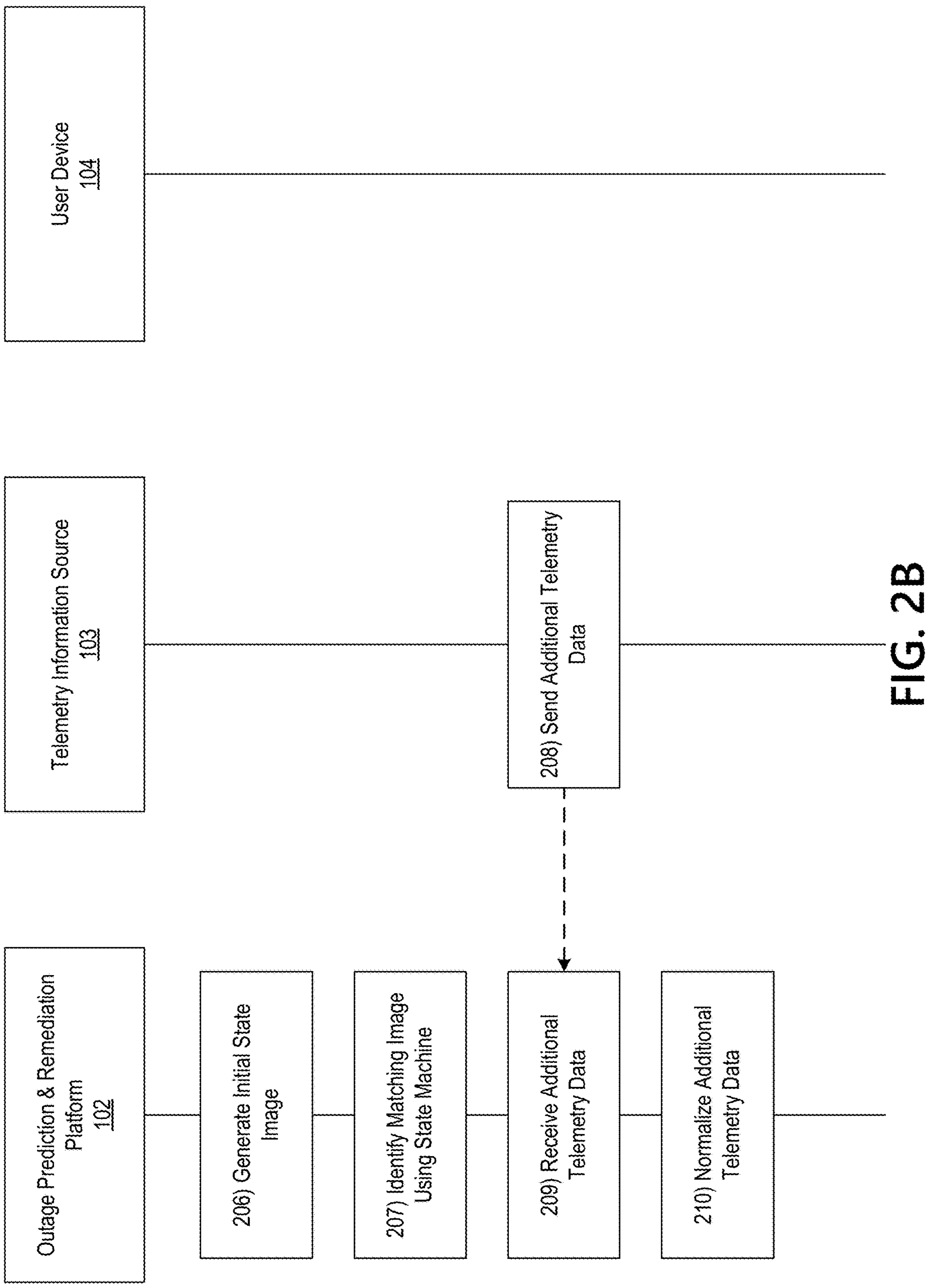

Referring to FIG. 2B, at step 206, the outage prediction and remediation platform 102 may generate an initial telemetry state image using the normalized initial telemetry data. For example, the outage prediction and remediation platform 102 may generate an image similar to the normalized image 700 depicted in FIG. 7. For example, the initial telemetry state image may include the initial telemetry data plotted against the various systems corresponding to the initial telemetry data and at a given time. Specifically, the initial telemetry state image may represent a heatmap corresponding to a current status of a system represented by the initial telemetry data. In essence, the initial telemetry state image may be a snapshot representation of the performance of these systems at a given time.

In some instances, in generating the initial telemetry state image, the outage prediction and remediation platform 102 may apply one or more thresholding techniques. For example, as a simple example, the outage prediction and remediation platform 102 may use green to represent any values from 0-3 (inclusive), yellow to represent any values from 3.1-6 (inclusive), and red to represent any values from 6.1-10 (inclusive). Any number of colors and/or threshold ranges may be implemented without departing from the scope of the disclosure.

At step 207, the outage prediction and remediation platform 102 may use one or more image matching techniques to identify a telemetry state image in the state machine that matches the initial telemetry state image. In some instances, the outage prediction and remediation platform 102 may identify an exact match. In other instances, the outage prediction and remediation platform 102 may identify a threshold match (e.g., at least a threshold level match). In some instances, the outage prediction and remediation platform 102 may identify a likelihood of failure and/or warning level corresponding to the matching image in the state machine, and may output an indication and/or take actions accordingly.

At step 208, the telemetry information source 103 may send additional telemetry data to the outage prediction and remediation platform 102. For example, the telemetry information source 103 may send telemetry data similar to the telemetry data sent at step 203, but which may correspond to a later time. In some instances, the telemetry information source 103 may send the additional telemetry data to the outage prediction and remediation platform 102 while the first wireless data connection is established.

At step 209, the outage prediction and remediation platform 102 may receive the additional telemetry data sent at step 208. For example, the outage prediction and remediation platform 102 may receive the additional telemetry data from the telemetry information source 103 via the communication interface 113 and while the first wireless data connection is established.

At step 210, the outage prediction and remediation platform 102 may normalize the additional telemetry data. For example, the outage prediction and remediation platform 102 may perform actions similar to those described above at step 205 with regard to the initial telemetry data.

Figure 2C:
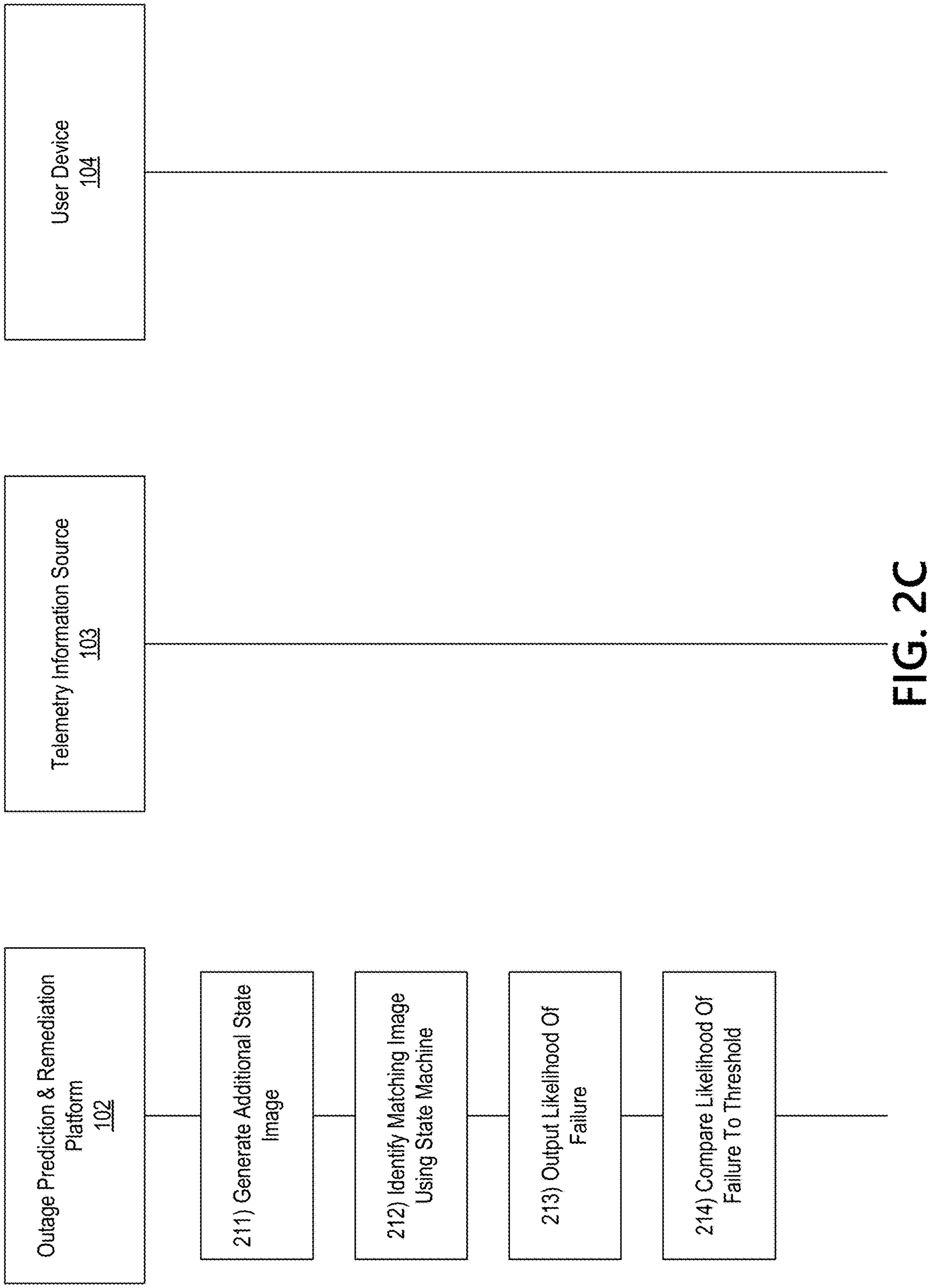

Referring to FIG. 2C, at step 211, the outage prediction and remediation platform 102 may generate an additional telemetry state image (e.g., using the additional telemetry data received at step 210). For example, the outage prediction and remediation platform 102 may perform actions similar to those described above at step 206 with regard to the initial telemetry state image.

At step 212, the outage prediction and remediation platform 102 may identify a matching image for the additional telemetry state image using the state machine. For example, the outage prediction and remediation platform 102 may perform actions similar to those described above at step 207 with regard to identifying a machine image for the initial telemetry state image. In some instances, in identifying the matching image for the additional telemetry state image, the outage prediction and remediation platform 102 may identify a matching pattern, corresponding to the initial telemetry state image, the additional telemetry state image, and the transition between them. For example, in referring to diagram 1200 of FIG. 12, the outage prediction and remediation platform 102 might not merely identify that the additional telemetry state image matches "Pattern #2." but may also identify that there was a transition from the initial telemetry state image, which may match "Pattern #1," to the additional telemetry state image represented by "Pattern #2."

At step 213, the outage prediction and remediation platform 102 may identify, using the state machine, a likelihood of failure and/or warning. For example, the outage prediction and remediation platform 102 may identify a likelihood of failure and/or warning that corresponds to a progression from the initial telemetry state image to the additional telemetry state image. For example, the state machine may have been pre-configured (e.g., at step 201) with the likelihood of failure and/or warning corresponding to these patterns and the corresponding transition. In some instances the outage prediction and remediation platform 102 may identify a numeric score representing a likelihood of failure. Additionally or alternatively, the outage prediction and remediation platform 102 may identify a warning level, indicating a severity and/or imminence of failure.

In identifying the likelihood of failure, the outage prediction and remediation platform 102 may identify a likelihood of failure corresponding to the additional telemetry state image, when taking into account the progression from the initial telemetry state image to the additional telemetry state image. For example, the likelihood of failure of the additional telemetry state image may vary depending on the progression of images leading up to it.

At step 214, the outage prediction and remediation platform 102 may compare the likelihood of failure to one or more failure thresholds. In some instances, the failure thresholds may represent numeric values (e.g., against which numeric representations of the likelihood of failure may be compared), warning thresholds (e.g., a particular warning label in a series of warning labels, increasing in severity, against which such likelihood of failure warning labels may be compared), and/or otherwise. In some instances, if the outage prediction and remediation platform 102 identifies that the likelihood of failure meets or exceeds the threshold, the outage prediction and remediation platform 102 may proceed to step 215. Otherwise, if the outage prediction and remediation platform 102 identifies that the likelihood of failure does not meet or exceed the threshold, the outage prediction and remediation platform 102 may proceed to step 219.

Figure 2D:
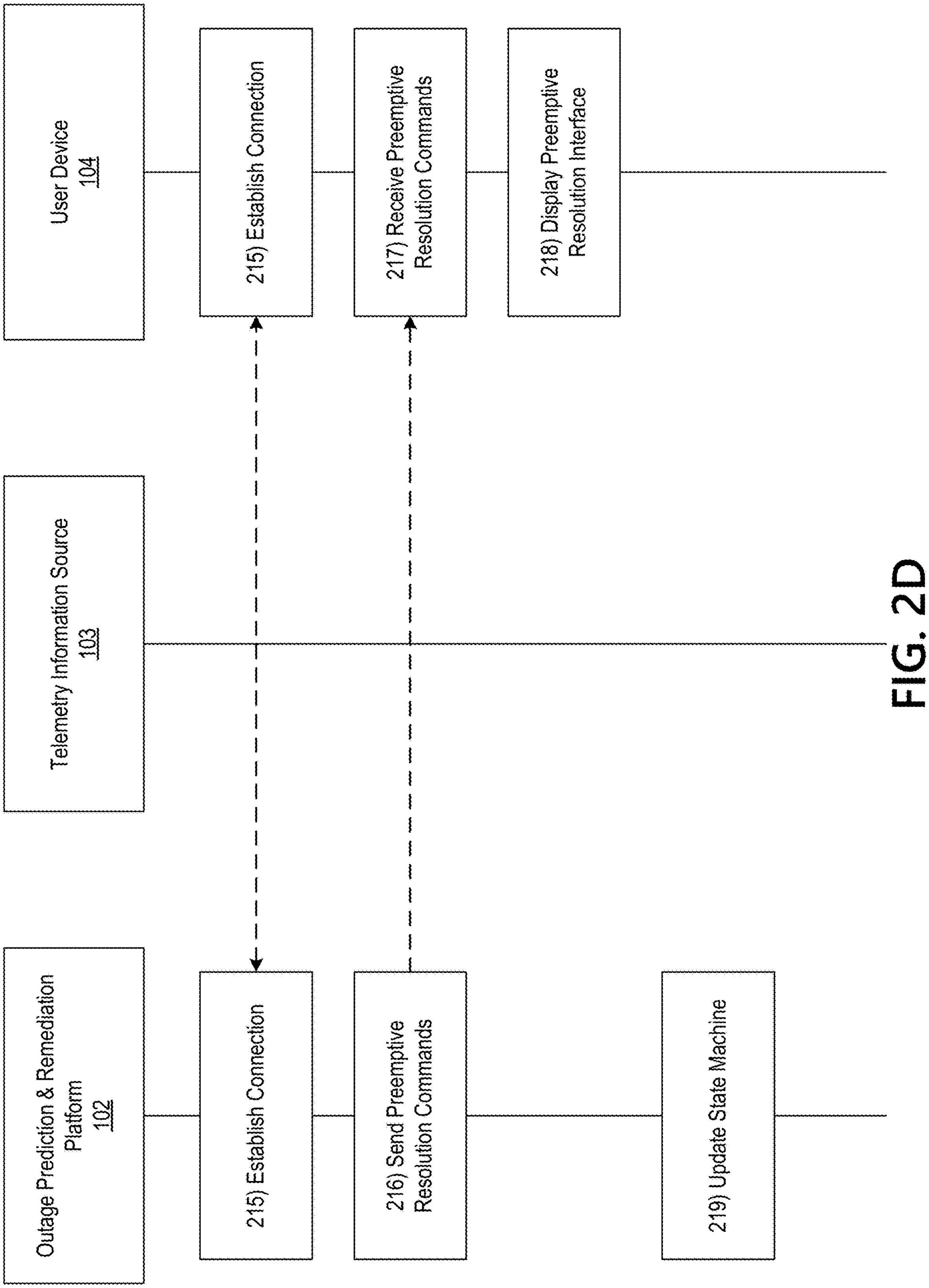

Referring to FIG. 2D, at step 215, the outage prediction and remediation platform 102 may establish a connection with the user device 104. For example, the outage prediction and remediation platform 102 may establish a second wireless data connection with the user device 104 to link the outage prediction and remediation platform 102 to the user device 104 (e.g., in preparation for sending pre-emptive resolution commands). In some instances, the outage prediction and remediation platform 102 may identify whether or not a connection is already established with the user device 104. If a connection is already established with the user device 104, the outage prediction and remediation platform 102 might not re-establish the connection. If a connection is not yet established with the user device 104, the outage prediction and remediation platform 102 may establish the second wireless data connection as described herein.

At step 216, the outage prediction and remediation platform 102 may send one or more preemptive resolution commands to the user device 104. For example, the outage prediction and remediation platform 102 may, in some instances, identify, using information stored in the state machine and corresponding to the telemetry state machine images identified as matching the initial telemetry state machine image, additional telemetry state machine images, and the corresponding transitions, one or more actions used to resolve the failure (which, in the example of the telemetry state machine images of the state machine may have actually occurred, but may, in the example of the initial/additional telemetry state machine images be predicted to occur). Accordingly, the outage prediction and remediation platform 102 may effectively identify, based on previously performed corrective actions for a given failure, actions that may be performed to preemptively avoid the failure (which may, e.g., be predicted to occur).

In some instances, the outage prediction and remediation platform 102 may identify a confidence level corresponding to the likelihood of failure. In some instances, this may be based on a matching level identified by the outage prediction and remediation platform 102 corresponding to the initial/additional telemetry state machine images and the telemetry state machine images stored in the state machine. Additionally or alternatively, this may be based on a confidence that the identify remediation action will preemptively avoid the predicted failure.

Figure 4:
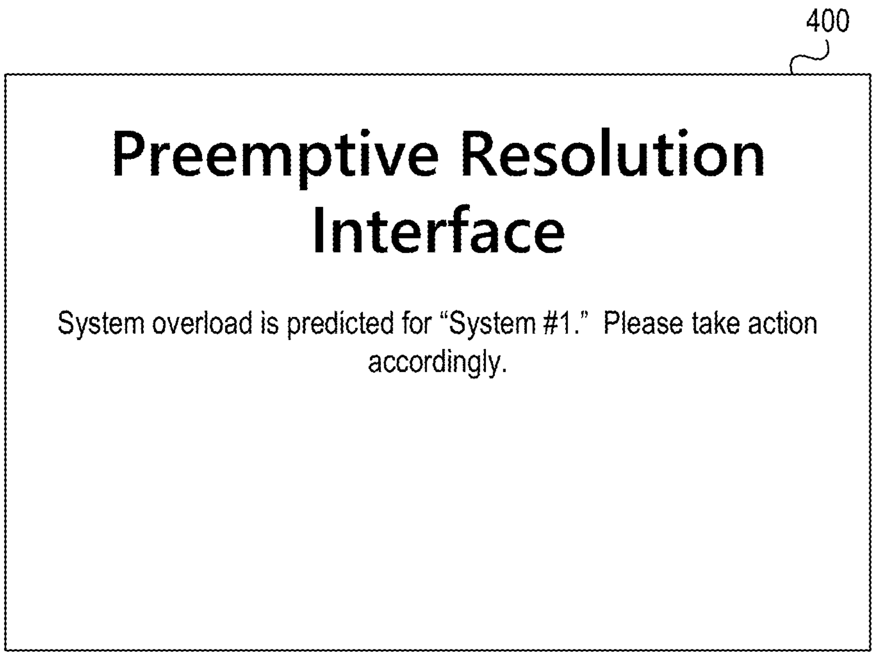
FIGS. 4-6 depict illustrative user interfaces for using a rules-based state machine to perform multi image matching for outage prediction, prevention, and mitigation in accordance with one or more example embodiments.

In some instances, the outage prediction and remediation platform 102 may identify that the confidence level fails to meet or exceed a first confidence threshold. In these instances, the outage prediction and remediation platform 102 may send a graphical user interface similar to graphical user interface 400, which is shown in FIG. 4, to the user device 104. For example, based on a relatively low confidence that an identified corrective action may be effective (or a failure to identify any particular action at all) and/or that an identified system performance pattern matches a historical pattern, the outage prediction and remediation platform 102 may merely send a notification of the predicted failure and prompt for action to be taken accordingly.

Figure 5:
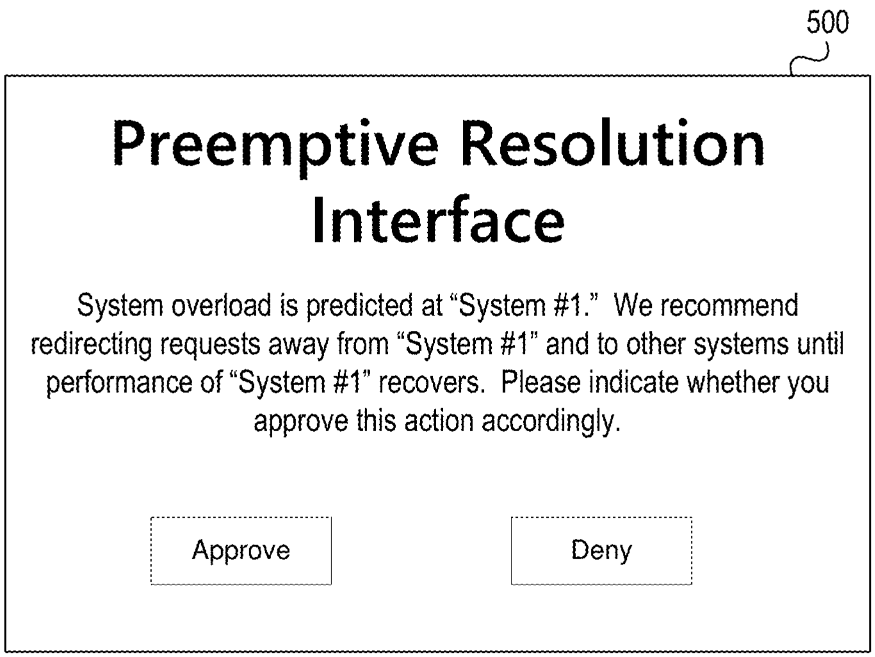

In some instances, the outage prediction and remediation platform 102 may identify that the confidence level meets or exceeds the first confidence threshold, but fails to meet or exceed a second confidence threshold (which may be higher than the first confidence threshold). In these instances, the outage prediction and remediation platform 102 may send a graphical user interface similar to graphical user interface 500, which is shown in FIG. 5, to the user device 104. For example, based on a medium level of confidence that an identified corrective action may be effective and/or that an identified system performance pattern matches a historical pattern, the outage prediction and remediation platform 102 may send a notification of the predicted failure and an identified remediating action. In this example, the outage prediction and remediation platform 102 may prompt a user to approve or reject the identified remediating action, and may automatically execute the action accordingly if approval is received.

Figure 6:
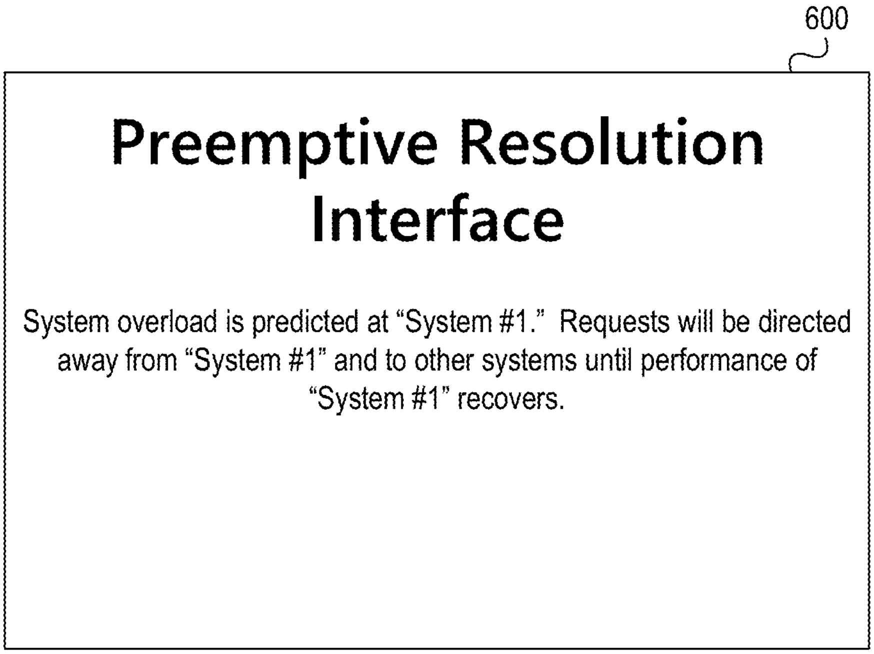

In some instances, the outage prediction and remediation platform 102 may identify that the confidence level meets or exceeds the second confidence threshold. In these instances, the outage prediction and remediation platform 102 may send a graphical user interface similar to graphical user interface 600, which is shown in FIG. 6, to the user device 104. For example, based on a relatively high level of confidence that an identified corrective action may be effective and/or that an identified system performance pattern matches a historical pattern, the outage prediction and remediation platform 102 may send a notification of the predicted failure, an identified remediating action, and an indication that the identified action will be automatically executed. In this example, the outage prediction and remediation platform 102 may also send commands directing performance of the identified action (which may, e.g., cause execution of the identified action). For example, the outage prediction and remediation platform 102 may send one or more commands directing a packet routing system, load balancing system, and/or other system to redirect requests, data, and/or information away from a first system (identified as overloaded) and towards one or more alternative systems, which may, e.g., cause the routing system to adjust the flow of information accordingly. In some instances, the outage prediction and remediation platform 102 may send the preemptive resolution commands to the user device 104 via the communication interface 113 and while the second wireless data connection is established.

At step 217, the user device 104 may receive the preemptive resolution commands sent at step 216. For example, the user device 104 may receive the preemptive resolution commands while the second wireless data connection is established.

At step 218, based on or in response to the one or more preemptive resolution commands, the user device 104 may display a pre-emptive resolution interface (e.g., similar to graphical user interface 400 of FIG. 4, graphical user interface 500 of FIG. 5, graphical user interface 600 of FIG. 6, and/or otherwise). In some instances, such as where a graphical user interface similar to graphical user interface 500 of FIG. 5 is displayed, user selection of an interface element may trigger the execution of one or more remediation actions indicated in the interface. For example, if the user approves a proposed action, their selection may notify the outage prediction and remediation platform 102, which may, e.g., cause performance of the proposed action accordingly.

At step 219, the outage prediction and remediation platform 102 may update the state machine based on the initial telemetry state image, the additional telemetry state image, the corresponding transition, an identified likelihood of failure, an identified remediating action, and/or other information. In doing so, the outage prediction and remediation platform 102 may continue to refine the state machine using a dynamic feedback loop, which may, e.g., increase the accuracy and effectiveness of the state machine in predicting and remediating potential system failures.

For example, the outage prediction and remediation platform 102 may use the initial telemetry state image, the additional telemetry state image, the corresponding transition, an identified likelihood of failure, an identified remediating action, and/or other information to reinforce, modify, and/or otherwise update the state machine, thus causing the state machine to continuously improve (e.g., in terms of predicting and remediating system failures).

In some instances, the outage prediction and remediation platform 102 may continuously refine any and/or all the state machine. In some instances, the outage prediction and remediation platform 102 may maintain an accuracy threshold for the state machine, and may pause refinement (through the dynamic feedback loops) of the state machine if the corresponding accuracy is identified as greater than the corresponding accuracy threshold. Similarly, if the accuracy fails to be equal or less than the given accuracy threshold, the outage prediction and remediation platform 102 may resume refinement of the state machine through the corresponding dynamic feedback loop.

Although only initial and one instance of additional telemetry data are described herein, this is for illustrative purposes only, and any number of additional rounds of telemetry data may be received and compared against the state machine using similar techniques to those described above. For example, as illustrated in FIGS. 10-13, four or more sets of telemetry data (e.g., four separate time instances) may, in some instances be used to identify a pattern. In these instances, the likelihood of failure may be modified and/or otherwise adjusted based on newly received telemetry data.

Furthermore, although the use of a state machine is primarily described, in some instances, alternative techniques, such as the use of a machine learning and/or artificial intelligence model may be used to produce similar results without departing from the scope of the disclosure. Furthermore, although the analysis of system telemetry data is primarily described, the methods described above may be used to analyze other types of information (e.g., application performance information, or the like) for failure prevention without departing from the scope of the disclosure.

Figure 3:
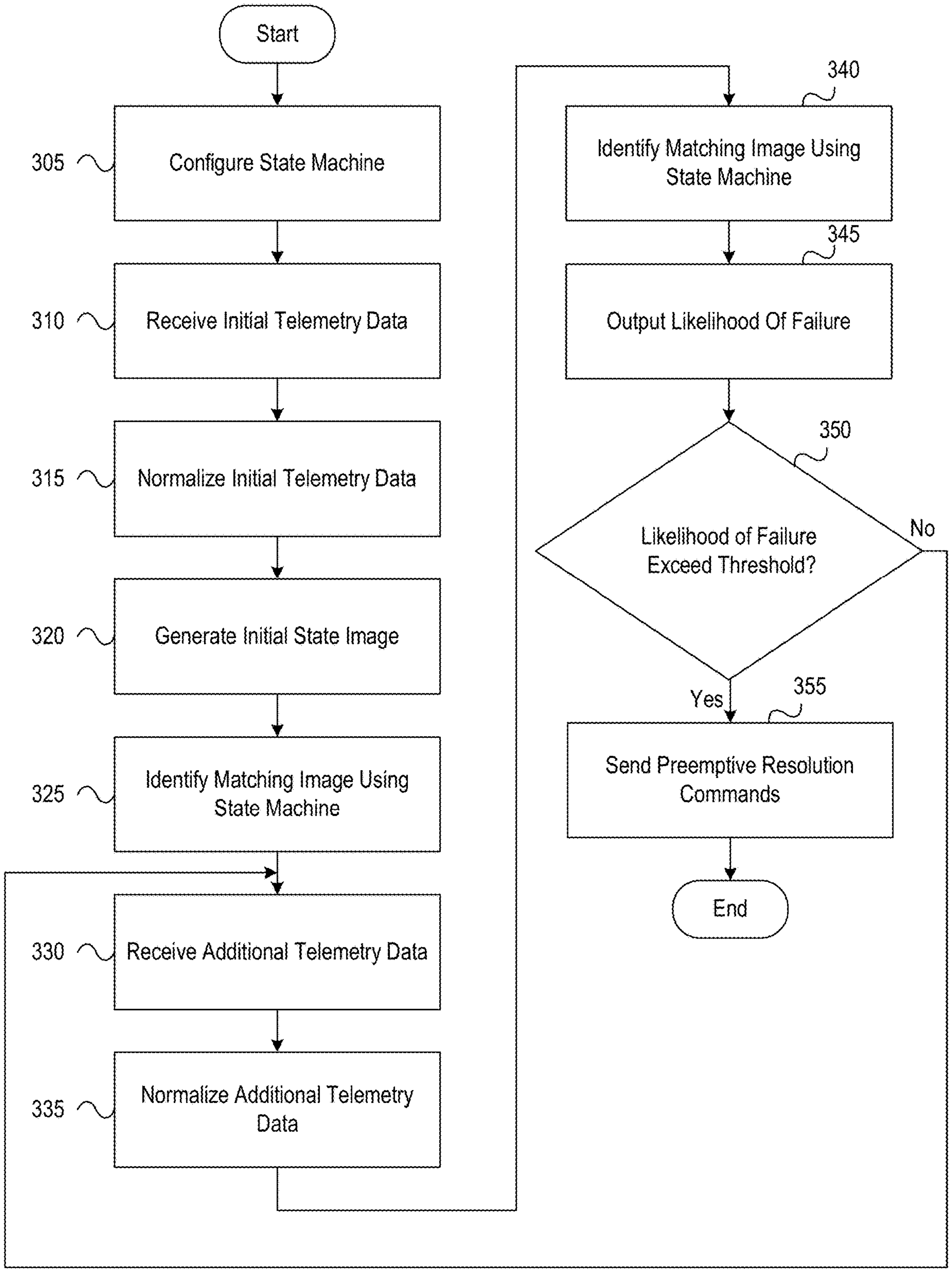
FIG. 3 depicts an illustrative method for using a rules-based state machine to perform multi image matching for outage prediction, prevention, and mitigation in accordance with one or more example embodiments.

FIG. 3 depicts an illustrative method for using a rules-based state machine to perform multi image matching for outage prediction, prevention, and mitigation in accordance with one or more example embodiments. Referring to FIG. 3, at step 305, a computing platform comprising one or more processors, memory, and a communication interface may configure a state machine. At step 310, the computing platform may receive initial telemetry data. At step 315, the computing platform may normalize initial telemetry data. At step 320, the computing platform may generate an initial state image based on the normalized initial telemetry data. At step 325, the computing platform may identify an image in the state machine that matches the initial state image. At step 330, the computing platform may receive additional telemetry data. At step 335, the computing platform may normalize the additional telemetry data. At step 340, the computing platform may identify an image in the state machine that matches the additional state image. At step 345, the computing platform may output a likelihood of failure using the state machine. At step 350, the computing platform may identify whether or not a likelihood of failure threshold is exceeded. If so, the computing platform may proceed to step 355 to send preemptive resolution commands. If not, the computing platform may return to step 330 to receive additional telemetry data.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
at least one processor;
a communication interface communicatively coupled to the at least one processor; and
memory storing computer-readable instructions that, when executed by the at least one processor, cause the computing platform to:
configure a rules-based state machine to predict system failure for a system based on telemetry state images and transitions between the telemetry state images;
receive initial telemetry data;
generate, based on the initial telemetry data, an initial telemetry state image;
receive additional telemetry data;
generate, based on the additional telemetry data, an additional telemetry state image;
compare a pattern, corresponding to the initial telemetry state image, the additional telemetry state image, and a transition between the initial telemetry state image and the additional telemetry state image, to the telemetry state images and the transitions between the telemetry state images of the rules-based state machine to identify a matching pattern, wherein comparing the pattern to the telemetry state images and the transitions between the telemetry state images of the rules-based state machine to identify the matching pattern comprises:
using an image matching model to:
identify a match between the initial telemetry state image and a first image of the telemetry state images, and
identify a match between the additional telemetry state images and a second image of the telemetry state images, wherein the second image of the telemetry state images is linked to the first image of the telemetry state images within the rules-based state machine, wherein a transition between the initial telemetry state image and the additional telemetry state image matches a transition between the first image and the second image;
identify, using the identified matching pattern, a likelihood of failure for the system; and
send, based on the likelihood of failure for the system, one or more preemptive resolution commands causing modification of operations at the system to prevent a predicted failure, wherein sending the one or more preemptive resolution commands comprises directing a load management server associated with the system to redirect incoming requests away from the system.

2. The computing platform of claim 1, wherein configuring the rules-based state machine comprises:
receiving historical telemetry data;
normalizing the historical telemetry data;
generating, based on the historical telemetry data, the telemetry state images;
identifying the transitions between the telemetry state images; and
labelling historical patterns corresponding to the telemetry state images and the transitions between the telemetry state images based on detected failures.

3. The computing platform of claim 1, wherein:
generating, based on the initial telemetry data, the initial telemetry state image comprises:
normalizing the initial telemetry data, and
generating the initial telemetry state image based on the normalized initial telemetry data; and
generating, based on the additional telemetry data, the additional telemetry state image comprises:
normalizing the additional telemetry data, and
generating the additional telemetry state image based on the normalized additional telemetry data.

4. The computing platform of claim 1, wherein identifying, using the identified matching pattern, the likelihood of failure for the system comprises:
identify a likelihood of failure of the matching pattern, wherein the matching pattern is labelled based on the likelihood of failure of the matching pattern.

5. The computing platform of claim 4, wherein the memory stores additional computer readable instructions that, when executed by the at least one processor, cause the computing platform to:
compare the likelihood of failure of the matching pattern to a failure threshold, wherein sending the one or more preemptive resolution commands causing modification of the operations at the system to prevent the predicted failure is in response to identifying that the likelihood of failure of the matching pattern meets or exceeds the failure threshold.

6. The computing platform of claim 1, wherein sending the one or more preemptive resolution commands comprises directing a user device to display a recommended solution to avoid the predicted failure along with a prompt for whether or not the recommended solution should be executed.

7. The computing platform of claim 6, wherein the memory stores additional computer readable instructions that, when executed by the at least one processor, cause the computing platform to:
receive user input accepting the recommended solution; and
execute, in response to receiving the user input, the recommended solution.

8. The computing platform of claim 1, wherein the memory stores additional computer readable instructions that, when executed by the at least one processor, cause the computing platform to:
receive third telemetry data;
generate, based on the third telemetry data, a third telemetry state image;
compare an updated pattern, corresponding to the initial telemetry state image, the additional telemetry state image, the transition between the initial telemetry state image and the additional telemetry state image, the third telemetry state image, and a transition between the additional telemetry state image and the third telemetry state image, to the telemetry state images and the transitions between the telemetry state images of the rules-based state machine to identify an updated matching pattern; and
identify, using the identified updated matching pattern, a new likelihood of failure for the system, wherein the new likelihood of failure is different than the likelihood of failure.

9. A method comprising:
at a computing platform comprising at least one processor, a communication interface, and memory:
configuring a rules-based state machine to predict system failure for a system based on telemetry state images and transitions between the telemetry state images;
receiving initial telemetry data;
generating, based on the initial telemetry data, an initial telemetry state image;
receiving additional telemetry data;
generating, based on the additional telemetry data, an additional telemetry state image;
comparing a pattern, corresponding to the initial telemetry state image, the additional telemetry state image, and a transition between the initial telemetry state image and the additional telemetry state image, to the telemetry state images and the transitions between the telemetry state images of the rules-based state machine to identify a matching pattern, wherein comparing the pattern to the telemetry state images and the transitions between the telemetry state images of the rules-based state machine to identify the matching pattern comprises:
using an image matching model to:
identify a match between the initial telemetry state image and a first image of the telemetry state images, and
identify a match between the additional telemetry state images and a second image of the telemetry state images, wherein the second image of the telemetry state images is linked to the first image of the telemetry state images within the rules-based state machine, wherein a transition between the initial telemetry state image and the additional telemetry state image matches a transition between the first image and the second image;
identifying, using the identified matching pattern, a likelihood of failure for the system; and
sending, based on the likelihood of failure for the system, one or more preemptive resolution commands causing modification of operations at the system to prevent a predicted failure, wherein sending the one or more preemptive resolution commands comprises directing a load management server associated with the system to redirect incoming requests away from the system.

10. The method of claim 9, wherein configuring the rules-based state machine comprises:
receiving historical telemetry data;
normalizing the historical telemetry data;
generating, based on the historical telemetry data, the telemetry state images;
identifying the transitions between the telemetry state images; and
labelling historical patterns corresponding to the telemetry state images and the transitions between the telemetry state images based on detected failures.

11. The method of claim 9, wherein:
generating, based on the initial telemetry data, the initial telemetry state image comprises:
normalizing the initial telemetry data, and
generating the initial telemetry state image based on the normalized initial telemetry data; and
generating, based on the additional telemetry data, the additional telemetry state image comprises:
normalizing the additional telemetry data, and
generating the additional telemetry state image based on the normalized additional telemetry data.

12. The method of claim 9, wherein identifying, using the identified matching pattern, the likelihood of failure for the system comprises:

identify a likelihood of failure of the matching pattern, wherein the matching pattern is labelled based on the likelihood of failure of the matching pattern.

13. The method of claim 12, further comprising:

comparing the likelihood of failure of the matching pattern to a failure threshold, wherein sending the one or more preemptive resolution commands causing modification of the operations at the system to prevent the predicted failure is in response to identifying that the likelihood of failure of the matching pattern meets or exceeds the failure threshold.

14. The method of claim 9, wherein sending the one or more preemptive resolution commands comprises directing a user device to display a recommended solution to avoid the predicted failure along with a prompt for whether or not the recommended solution should be executed.

15. The method of claim 14, further comprising:

receiving user input accepting the recommended solution; and executing, in response to receiving the user input, the recommended solution.

16. One or more non-transitory computer-readable media storing instructions that, when executed by a computing platform comprising at least one processor, a communication interface, and memory, cause the computing platform to:

configure a rules-based state machine to predict system failure for a system based on telemetry state images and transitions between the telemetry state images;

receive initial telemetry data;

generate, based on the initial telemetry data, an initial telemetry state image;

receive additional telemetry data;

generate, based on the additional telemetry data, an additional telemetry state image;

compare a pattern, corresponding to the initial telemetry state image, the additional telemetry state image, and a transition between the initial telemetry state image and the additional telemetry state image, to the telemetry state images and the transitions between the telemetry state images of the rules-based state machine to identify a matching pattern, wherein comparing the pattern to the telemetry state images and the transitions between the telemetry state images of the rules-based state machine to identify the matching pattern comprises:

using an image matching model to:

identify a match between the initial telemetry state image and a first image of the telemetry state images, and identify a match between the additional telemetry state images and a second image of the telemetry state images, wherein the second image of the telemetry state images is linked to the first image of the telemetry state images within the rules-based state machine, wherein a transition between the initial telemetry state image and the additional telemetry state image matches a transition between the first image and the second image;

identify, using the identified matching pattern, a likelihood of failure for the system; and send, based on the likelihood of failure for the system, one or more preemptive resolution commands causing modification of operations at the system to prevent a predicted failure, wherein sending the one or more preemptive resolution commands comprises directing a load management server associated with the system to redirect incoming requests away from the system.

* * * * *